United States Patent
Hsueh et al.

(10) Patent No.: US 7,661,021 B2
(45) Date of Patent: Feb. 9, 2010

(54) METHOD FOR DEFECT MANAGEMENT IN REWRITABLE OPTICAL STORAGE MEDIA

(75) Inventors: Ching-Wen Hsueh, Yilan County (TW); Shih-Hsin Chen, Hsinchu County (TW); Kuo-Lung Chien, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 376 days.

(21) Appl. No.: 11/772,291

(22) Filed: Jul. 2, 2007

(65) Prior Publication Data
US 2008/0013418 A1 Jan. 17, 2008

Related U.S. Application Data

(60) Provisional application No. 60/807,076, filed on Jul. 12, 2006, provisional application No. 60/825,934, filed on Sep. 18, 2006.

(51) Int. Cl.
*G06F 11/00* (2006.01)
(52) U.S. Cl. ............................................................. 714/8
(58) Field of Classification Search ........................ None
See application file for complete search history.

(56) References Cited

U.S. PATENT DOCUMENTS

| 2005/0262384 A1* | 11/2005 | Andoh et al. .................. 714/5 |
| 2006/0153026 A1* | 7/2006 | Blacquiere et al. ......... 369/47.1 |
| 2008/0098051 A1* | 4/2008 | Blacquiere et al. .......... 707/205 |
| 2008/0130456 A1* | 6/2008 | Park ........................ 369/59.23 |

* cited by examiner

*Primary Examiner*—Michael C Maskulinski
(74) *Attorney, Agent, or Firm*—Thomas, Kayden, Horstemeyer & Risley

(57) ABSTRACT

A method for defect management of a rewritable optical disc is provided. The rewritable optical disc has a data area comprises recording units for storing a target data and a replacement area comprising first replacement units for replacing defective recording units of the data area. First, a fragmented status of the target data is calculated, wherein the fragmented status reflects a dispersion level of the first replacement units in view of a distribution of the defective recording units. The fragmented status is then compared with a threshold value to determine whether to perform a defragment operation about the target data. Finally, the defragment operation about the target data is performed by rearranging the first replacement units in accordance with the sequence of the defective recording units.

20 Claims, 14 Drawing Sheets

METHOD FOR DEFECT MANAGEMENT IN REWRITABLE OPTICAL STORAGE MEDIA

CROSS REFERENCE TO RELATED APPLICATIONS

This application claims the benefit of U.S. Provisional Application No. 60/807,076, filed July 12, and U.S. Provisional Application No. 60/825,934, filed Sep. 18, 2006.

BACKGROUND OF THE INVENTION

1. Field of the Invention

The invention relates to optical storage media, and more particularly to the defect management of optical storage media.

2. Description of the Related Art

Optical storage media, such as Compact Discs (CD), Digital Versatile Discs (DVD), and Magneto-Optical (MO) discs, have become the most popular storage media for digital data. Optical discs have some advantages over magnetic discs. They have higher capacities as removable modules, and they are not subject to head crashes or corruption from stray magnetic fields. They also have a 30-year life and are less vulnerable to extremes of hot and cold. As other storage media, data recording errors in an optical storage media may occasionally occur, such as bad sectors. Thus, an optical storage media requires recording the location of defective data sectors and storing the data of the bad sectors onto other good sectors. This is called "defect management".

FIG. 1 shows an example of the conventional method for defect management of an optical storage medium. The optical storage medium may be a CD, DVD, or MD. An optical disc drive is used to read the optical storage medium or write data on the optical storage medium. The optical storage medium has a data area 102 and a replacement area 104. The data area includes recording units for storing user data. The replacement area 104 has replacement units for replacing the defective recording units to store the corresponding user data. Each recording unit can be addressed by a physical unit number (PUN), and each replacement unit can be address by a physical replacement unit number, denoted by DF.

For example, the data area 102 includes four consecutive recording units of which the physical unit numbers are respectively 0, 1, 2, and 3. The recording units PUN0~PUN3 are assumed to be damaged. When the optical disc drive intends to store a unit of data in the recording units PUN0~PUN3, errors occur because the four recording units are defective. Thus, the data cannot be directly stored in the four defective recording units of the data area 102. Instead, the optical disc drive allocates another four replacement units DF0, DF1, DF2, and DF3 in the replacement area 104, and respectively stores the data originally intended to be stored in the defective recording units PUN0, PUN1, PUN2, and PUN3 in the successive replacement units DF0, DF1, DF2, and DF3. These replacement units of the replacement area 104 are respectively replacing the recording units PUN0, PUN1, PUN2, and PUN3. In addition, the mapping relation between the defective recording units PUN0, PUN1, PUN2, and PUN3 and replacement units DF0, DF1, DF2, and DF3 are recorded in a defect table.

When a host attempts to read the unit of data from the defective recording unit PUN0 through PUN3 via the optical disc drive, the optical disc drive first search the defect table for the replacement unit. Because the replacement unit corresponding to the defective recording unit PUN0 is DF0, the optical disc drive then retrieves data in the replacement unit DF0. Because the access time of a optical disc drive mainly proportional to track-seeking frequency, when the optical disc drive reads the replacement unit DF0, all other replacement units DF1, DF2, and DF3 which are corresponding to the same unit of data are read in sequence to reduce track-seeking frequency. And then the optical disc drive delivers the retrieved data of the replacement units DF0, DF1, DF2, and DF3 to the host. This situation is called "non-fragmented case", because the replacement units of the sequential data are stored in successive replacement units.

The replacement units of the defective recording units, however, are not always in succession to each other. FIG. 2 shows another example of the conventional method for defect management of an optical storage medium. In this example, the data area 202 includes four successive defective recording units PUN0, PUN1, PUN2, and PUN3. The replacement units corresponding to the four defective recording units, however, are respectively DF0, DF300, DF200, and DF100, which are not sequentially arranged as in the example of FIG. 1. This is because the errors of the four defective recording units happen at different time. The defective recording unit PUN0 is first damaged, and the optical disc drive allocates the replacement unit DF0 to store the corresponding data of defective recording unit PUN0. The defective recording units PUN3, PUN2, and PUN1 are then sequentially damaged at different time, and the optical disc drive sequentially allocates the replacement units DF100, DF200, and DF300 to respectively store the corresponding data of defective recording units PUN1, PUN2, and PUN3. As a result, the replacement units of the defective recording units are separated by a great distance. This situation is called "fragmented case", because the replacement units corresponding to the successive defective recording units PUN0 through PUN3 are not successively.

When a host attempts to read the unit of data from the defective recording units PUN0 through PUN3 of FIG. 2 via the optical disc drive, the optical disc drive needs spend a long time to retrieve the unit of data from the discrete replacement units. Accordingly, to reduce track-seeking frequency, the four replacement units DF0, DF1, DF2, and DF3 are accessed together. The replacement units DF1, DF2, and DF3, however, are not replacement units in successive as shown in the situation of FIG. 1. Therefore, the optical disc drive need to search the defect table to locate the replacement units DF300, DF 200, and DF100 respectively. Because the replacement units DF300, DF 200, and DF100 are separated by a great distance, reading the replacement units DF300, DF 200, and DF100 respectively requires a track-seek operation. That is to say, reading data from the defective recording units PUN0~PUN3 requires four track-seeking events, thus increasing the access latency of the optical storage medium. Therefore, a method for defect management of an optical storage medium is required to prevent the fragmented case and to reduce the access latency is desirable.

BRIEF SUMMARY OF THE INVENTION

A method for defect management of a rewritable optical disc is provided. The rewritable optical disc has a data area comprising recording units for storing a target data and a replacement area comprising first replacement units for replacing defective recording units of the data area. First, a fragmented status of the target data is calculated, wherein the fragmented status reflects a dispersion level of the first replacement units in view of a distribution of the defective recording units. The fragmented status is then compared with a threshold value to determine whether to perform a defragment operation about the target data. Finally, the defragment operation about the target data is performed by rearranging the first replacement units in accordance with the sequence of the defective recording units.

A system for performing defragment of a rewritable optical disc is provided. The rewritable optical disc has a data area including recording units for storing a target data and a replacement area including first replacement units for replacing defective recording units of the data area. The system comprises a host and an optical disc drive. The host calculates a fragmented status reflecting a dispersion level of the first replacement units in view of a distribution of the defective recording units, and compares the fragmented status with a threshold value to determine whether to perform a defragment operation about the target data. The optical disc drive then performs the defragment operation about the target data by rearranging the first replacement units in accordance with the sequence of the defective recording units.

An optical disc drive for performing defragment of a rewritable optical disc is provided. The rewritable optical disc has a data area including recording units for storing target data and a replacement area including first replacement units for replacing defective recording units of the data area. The optical disc drive first calculates a fragmented status reflecting a dispersion level of the first replacement units in view of a distribution of the defective recording units, then compares the fragmented status with a threshold value to determine whether to perform a defragment operation about the target data, and then performs the defragment operation about the target data by rearranging the first replacement units in accordance with the sequence of the defective recording units.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
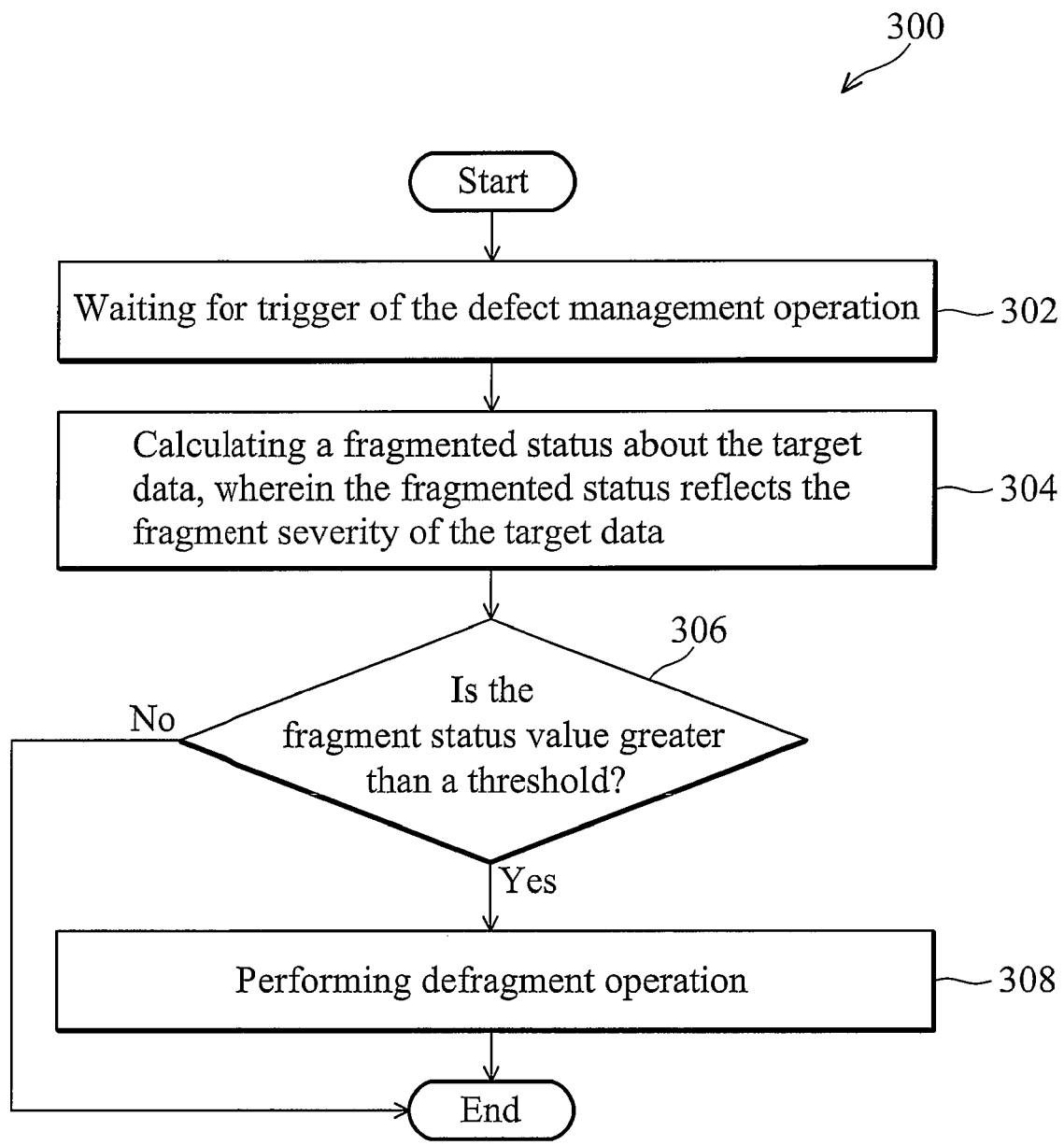
FIG. 3 is a flowchart of a method for defect management of a rewritable optical storage medium according to the invention.

FIG. 3 is a flowchart of a method 300 for defect management of a rewritable optical storage medium according to the invention. The rewritable optical storage medium may be a CD, DVD, MD, HDDVD or other the like. The rewritable optical storage medium has a data area including a plurality of recording units and a replacement area including a plurality of replacement units. The recording units are utilized for storing user data, the replacement units are utilized to replace defect recording units for storing the corresponding user data. The recording unit could be a packet for a CD disc, an ECC block for a DVD disc, a segment for a HDDVD disc, or a cluster for a Blu-ray disc. A target data recorded on the data area is assumed to be the target object for performing the defect management. The target data may be a single file or a file system which includes multiple files. The target data are recorded in several recording units, including recording units, replacement units, or both of them. First, the defect management operation is triggered in step 302. The trigger of the defect management operation is categorized as stationary trigger and dynamic trigger. When an optical disc is inserted into the optical disc drive, i.e. tray in, the defect management operation is triggered, referred to as stationary trigger. Dynamic trigger includes a few cases. For example, when the quantities of recording data transferred from a host to the optical disc drive is greater than a first predetermined threshold, or when the number of commands, such as ATAPI commands, received by the optical disc drive is greater than a second predetermined threshold, or when the host issue a command to require the optical disc drive to perform a defragment operation, the defect management operation is triggered.

A fragmented status about the target data is then calculated in step 304. The fragmented status indicates the distribution of the replacement units corresponding to the defective recording units. Thus, the fragmented status reflects the dispersion level of the replacement units of the target data in view of the defective recording unit distribution. If a distribution range of the defective recording units storing the target data is represented by a defective recording unit distribution, and a distribution range of the replacement units storing the data copies of the defective recording units of the target data is represented by a replacement unit distribution, the fragmented status can be estimated by contrasting the replacement unit distribution and the defective recording unit distribution. In one embodiment, the fragmented status value may be obtained by dividing the replacement unit distribution by the defective recording unit distribution:

$$\text{Fragmented\_Status\_Value} = \frac{\text{replacement\_unit\_distribution}}{\text{defective\_recording\_unit\_ditribution}} \quad (1)$$

Three embodiments for calculating the fragmented status are illustrated in the following. In a first embodiment, the replacement unit distribution is indicated by the absolute of the difference between the largest and the smallest physical unit numbers of the replacement units, and the defective recording unit distribution is indicated by the absolute of the difference between the largest and the smallest physical unit numbers of the defective recording units. Thus, the fragmented status value is obtained according to the following algorithm:

$$\text{Fragmented\_Status\_Value} = \frac{|\text{Largest\_replace\_DF} - \text{Smallest\_replace\_DF}|}{|\text{Largest\_defective\_PUN} - \text{Smallest\_defective\_PUN}|} \quad (2)$$

In the second embodiment, the replacement unit distribution is indicated by the variance of the physical unit numbers of the replacement units, and the defective recording unit distribution is indicated by the variance of the physical unit numbers of the defective recording units. Thus, the fragmented status value is obtained according to the following algorithm:

$$\text{Fragmented\_Status\_Value} = \frac{\sum_{k=0}^{N-1}\left|\text{replace\_DF}(k) - \frac{1}{N}\sum_{j=0}^{N-1}\text{replace\_DF}(j)\right|^2}{\sum_{k=0}^{N-1}\left|\text{defective\_PSN}(k) - \frac{1}{N}\sum_{j=0}^{N-1}\text{defective\_PSN}(j)\right|^2}; \quad (3)$$

wherein k and j are indexes of the replacement units or the defective recording units, and N is the total number of the defective recording units of target data.

In a third embodiment, the fragmented status value is determined by the total seek times and obtained according to the following algorithm:

$$\text{Fragmented\_Status\_Value} = \sum_{K=0}^{N-1} R(k); \quad (4)$$

wherein if (replace_PUN(k)−replace_PUN(k−1))>replace_cache_size then R(k)=1 else R(k)=0;

wherein k is an index of the replacement units or the defective recording units, and N is the total number of the replacement units of target data.

Figure 1:
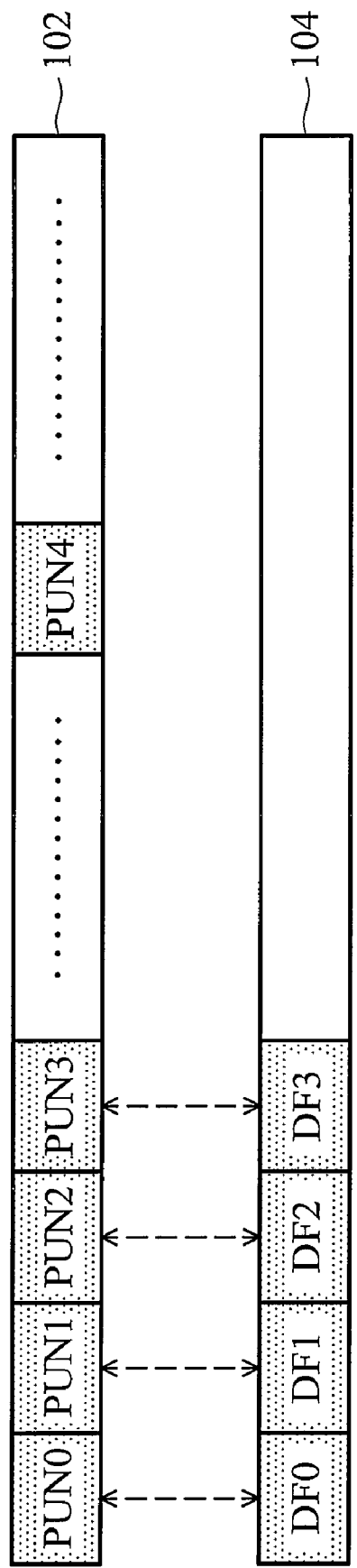
FIG. 1 shows an example of the conventional method for defect management of an optical storage medium.
Figure 2:
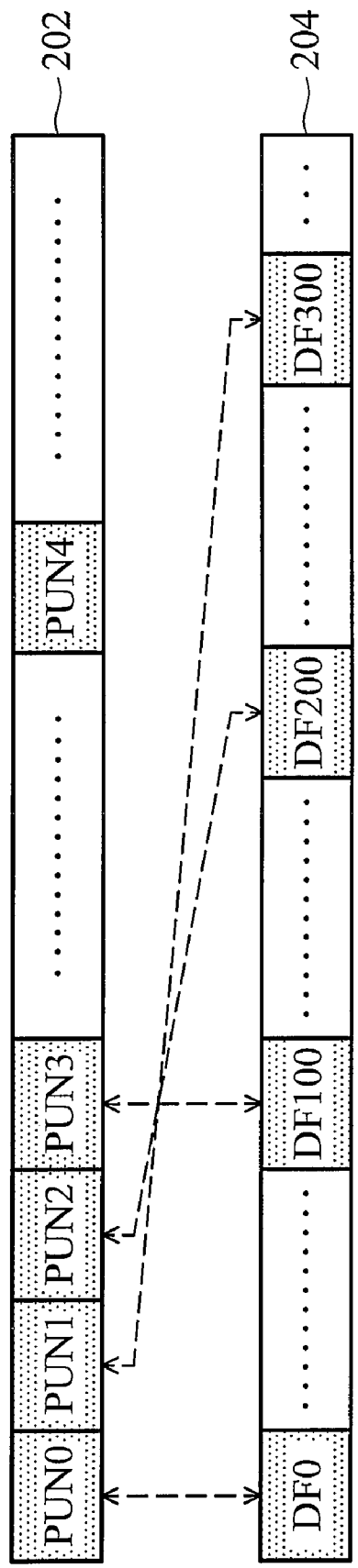
FIG. 2 shows another example of the conventional method for defect management of an optical storage medium.

For example, a target data is assumed to be a file which recording into the data area includes four defective recording units PUN0~PUN3 as shown in FIG. 1 and FIG. 2. As for the non-fragmented case of FIG. 1, if the fragmented status value is calculated according to the algorithm (2), the defective recording unit distribution is "3" by subtracting the smallest physical unit number 0 from the largest physical unit number 3, and the replacement unit distribution is "3" by subtracting the smallest replacement unit number 0 from the largest replacement unit number 3. Therefore, the fragmented status value is "1" by dividing the replacement unit distribution "3" by the defective recording unit distribution "3". As for the fragmented case of FIG. 2, if the fragmented status value is calculated according to the algorithm (2), the defective recording unit distribution is "3" by subtracting the smallest physical unit number 0 from the largest physical unit number 3. The replacement unit distribution, however, is "300" by subtracting the smallest replacement unit number 0 from the largest replacement unit number 300. Therefore, the fragmented status value is "100" by dividing the replacement unit distribution "300" by the defective recording unit distribution "3", and the fragmented status value of the fragmented case of FIG. 2 is 100 times larger than the fragmented status value of the non-fragmented case of FIG. 1.

Whether to defragment the replacement area of the rewritable optical storage medium is then determined in step 306 according to the fragmented status value calculation of step 304. The fragmented status value may be compared with a third predetermined threshold. For example, the third predetermined threshold value may be equal to 1. If the fragmented status value is greater than the threshold value in step 306, defragment operation is performed in step 308, so that the replacement units of the target data are rearranged in accordance with the sequence of the defective recording units. For example, because the fragmented status values of the fragmented and non-fragmented cases are respectively 100 and 1, the replacement area of the fragmented case of FIG. 2 requires defragmenting. When the target data is a single file, the basis of analysis of the fragmented status of step 302 and the defragmentation of the replacement area of step 308 are implemented across all the replacement units corresponding to the single file of the target data. When the target data is a file system including multiple files, the basis of analysis of the fragmented status of step 302 and the defragmentation of the replacement area of step 308 are implemented across all the replacement units corresponding to the files included by the target data.

Figure 4A:
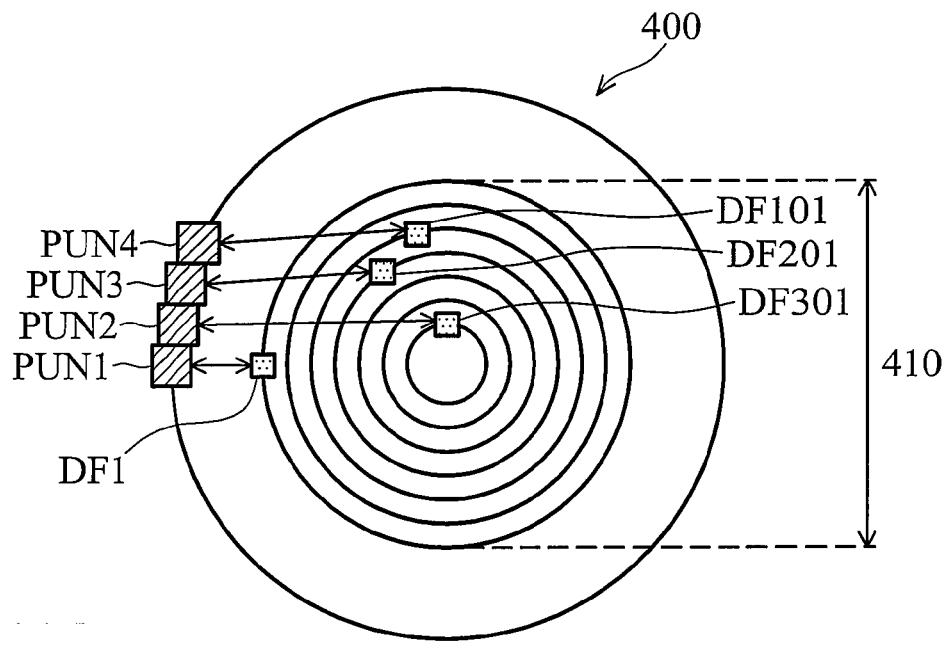
FIG. 4A shows the distribution of replacement units on an optical disc before defragment operation.
Figure 4B:
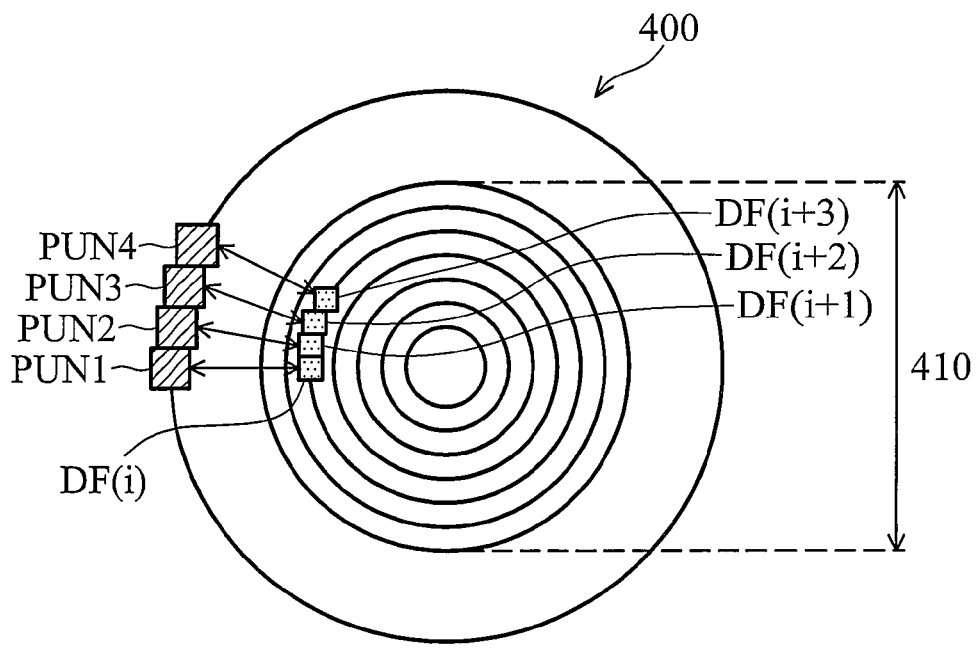
FIG. 4B shows the distribution of replacement units on an optical disc after the defragment operation is performed according to the slow method.

There are three methods for performing the defragment operation in step 308, including a slow method, a fast method, and a writing method. FIG. 4A shows the distribution of replacement units on an optical disc 400 before defragment operation. Four replacement units DF1, DF301, DF201, and DF101, are respectively replacing the defective recording units PUN1, PUN2, PUN3, and PUN4. As for the slow method, all the replacement units of the replacement area 410 are rearranged, i.e. defragment, so that data copies of the defective recording units are stored in physically successive replacement units of the replacement area, and replacement units respectively corresponding to consecutive defective recording units storing the target data are adjacent to each other. FIG. 4B shows the distribution of replacement units on an optical disc 400 after the defragment operation is performed according to the slow method. All the replacement units are rearranged and the new replacement units corresponding to the defective recording units PUN1, PUN2, PUN3, and PUN4 are respectively DF(i), DF(i+1), DF(i+2), and DF(i+3), which are physically contiguous and permuted in the sequence of the corresponding defective recording units. This method, however, requires more effort for rearranging all the replacement units and causes latency. Because the replacement units of the target data are rearranged in accordance with the sequence of the defective recording units now, the data of the replacement units can be sequentially read to reduce track-seeking frequency. Thus, when the target data is read, the access latency of the target data is decreased, and the performance of accessing the optical storage media is improved.

Figure 4C:
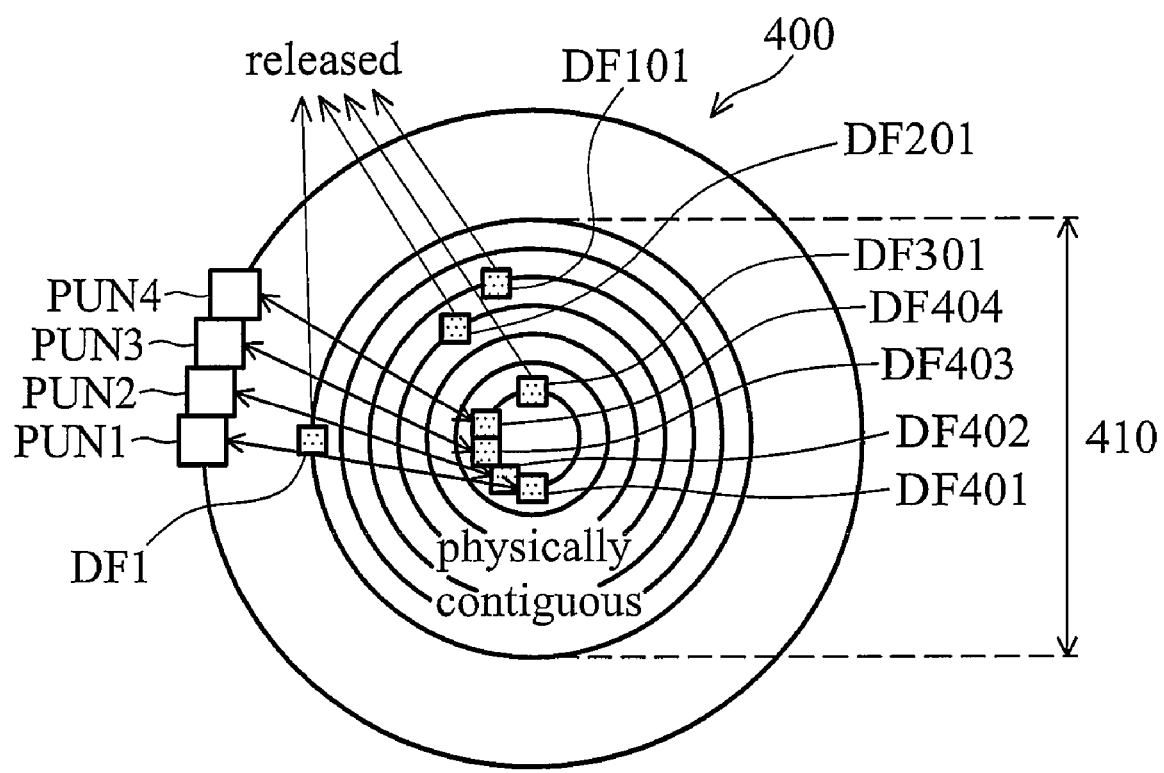
FIG. 4C shows the distribution of replacement units on the optical disc after the defragment operation is performed according to the fast method.

As for the fast method, a spare space of the replacement area may first be allocated, and all replacement units corresponding to the defective recording units of the target data are then copied to the spare space in accordance with the sequence of the defective recording units, so that replacement units respectively corresponding to consecutive defective recording units of the target data are adjacent to each other. The space originally storing the replacement units corresponding to the defective recording units of the target data is then released. FIG. 4C shows the distribution of replacement units on the optical disc 400 after the defragment operation is performed according to the fast method. The new replacement units of the defective recording units PUN1, PUN2, PUN3, and PUN4 are respectively DF401, DF402, DF403, and DF404, physically contiguous, and permuted in the sequence of the corresponding defective recording units. The original replacement units DF1, DF301, DF201, and DF101 are then released. Because the replacement units of the target data are rearranged in accordance with the sequence of the defective recording units now, the data of the replacement units can be sequentially read to reduce track-seeking frequency. Thus, when the target data is read, the access latency of the target data is decreased, and the performance of accessing the optical storage media is improved.

Another issue to be considered when the fast method is used to implement defragment operation is about the released replacement units DF1, DF301, DF201, and DF101. According to the HDDVD-RW specification, when a new defective recording unit is detected, the first available replacement unit of the replacement area replaces the new detected defective recording unit. The first available replacement unit is picking up from the available replacement units. Because the replacement area is a limited resource, if the fast method is repeated to implement defragment operation for a lot of times. That results the quantity of the available replacement units becoming less and less. Therefore, the released replacement units such as the DF1, DF301, DF201 of FIG. 4B can not be reused and it requires to be recovered.

Figure 5:
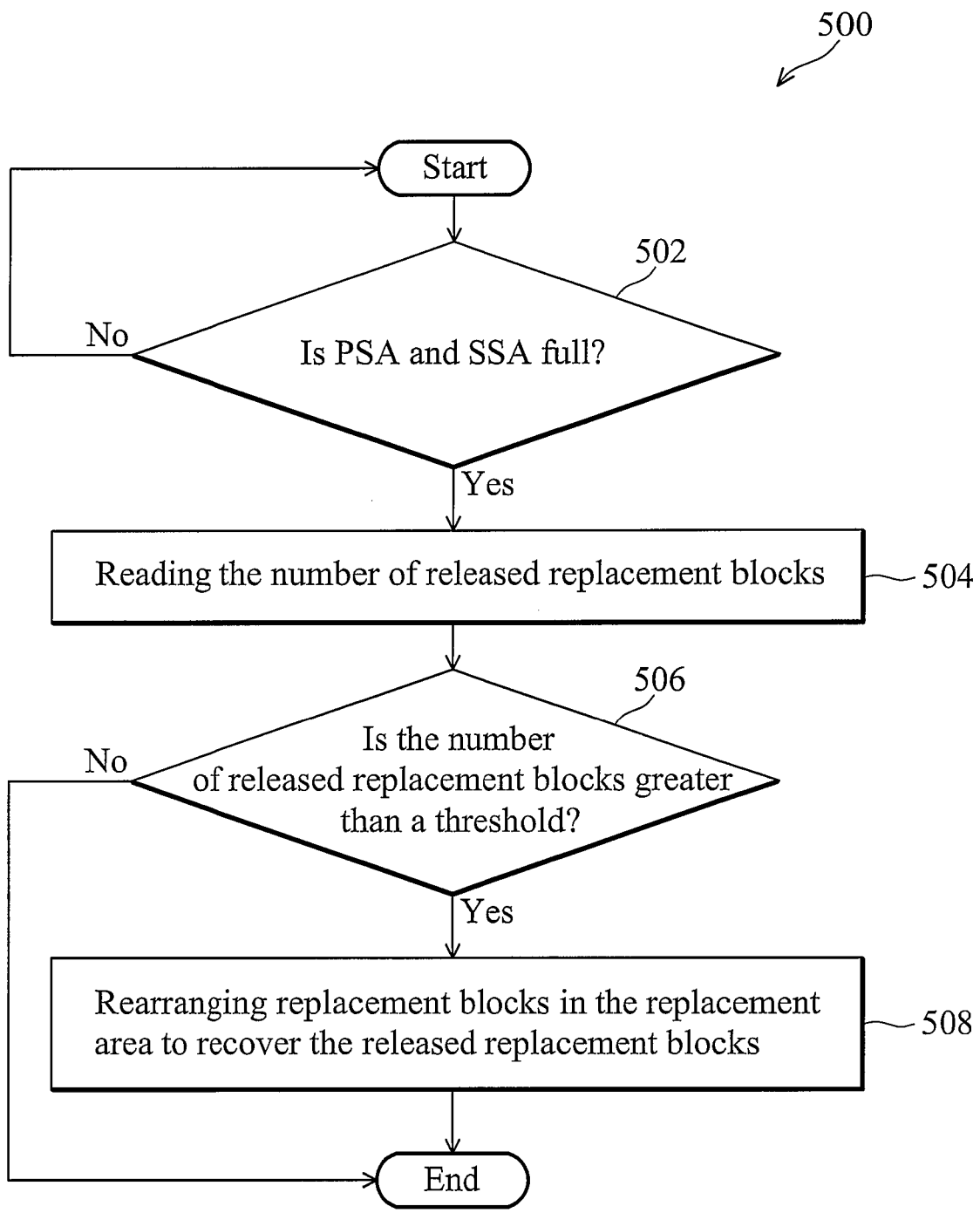
FIG. 5 is a flowchart of a method for recovering the released replacement units.

FIG. 5 is a flowchart of a method 500 for recovering the released replacement units. The replacement area of an optical disc includes a primary spare area (PSA) and a secondary spare area (SSA). If all of the replacement units of both the primary spare area and the secondary spare area are used, whether the replacement unit is released or not, then no new replacement units can be allocated to record the data copies of next new detected defective recording units. Thus, the step of whether the replacement unit is available is first detected in step 502 to confirm the occasion for performing replacement area recovery. A variable for storing the number of released replacement units is then read in step 504. The variable is stored in a detect table of the optical disc. If the number of released replacement units is greater than a fourth threshold in step 506, the replacement area recovery is executed to recover the released replacement units. The replacement units in the replacement area are then rearranged in step 508 to recover the released replacement units.

Figure 6A:
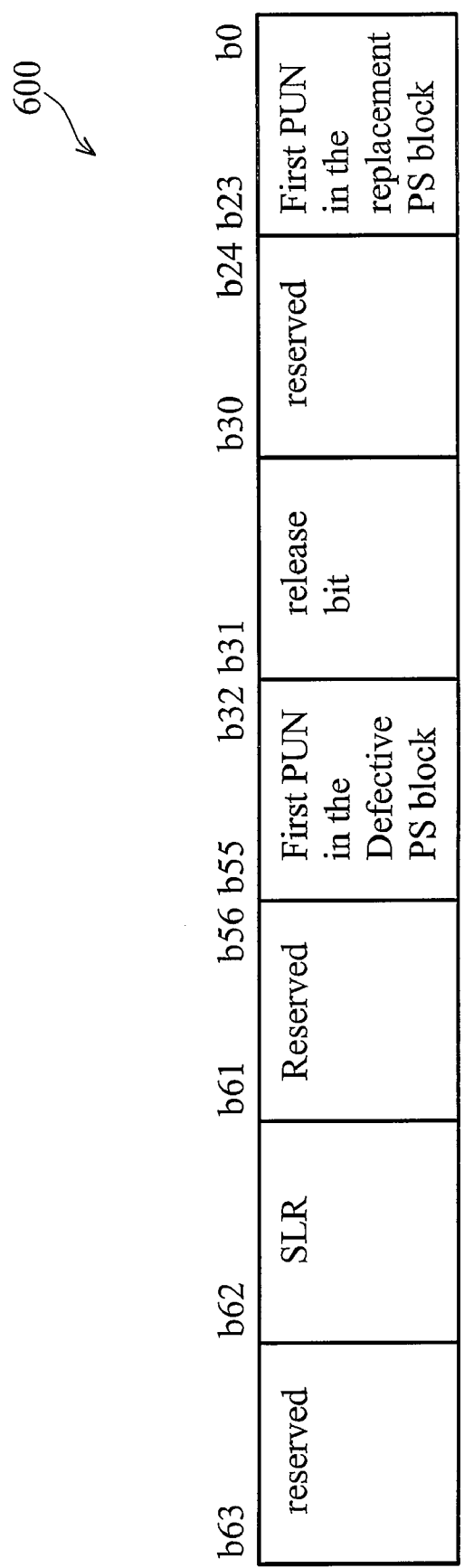
FIG. 6A shows a format of a secondary defect list.
Figure 6B:
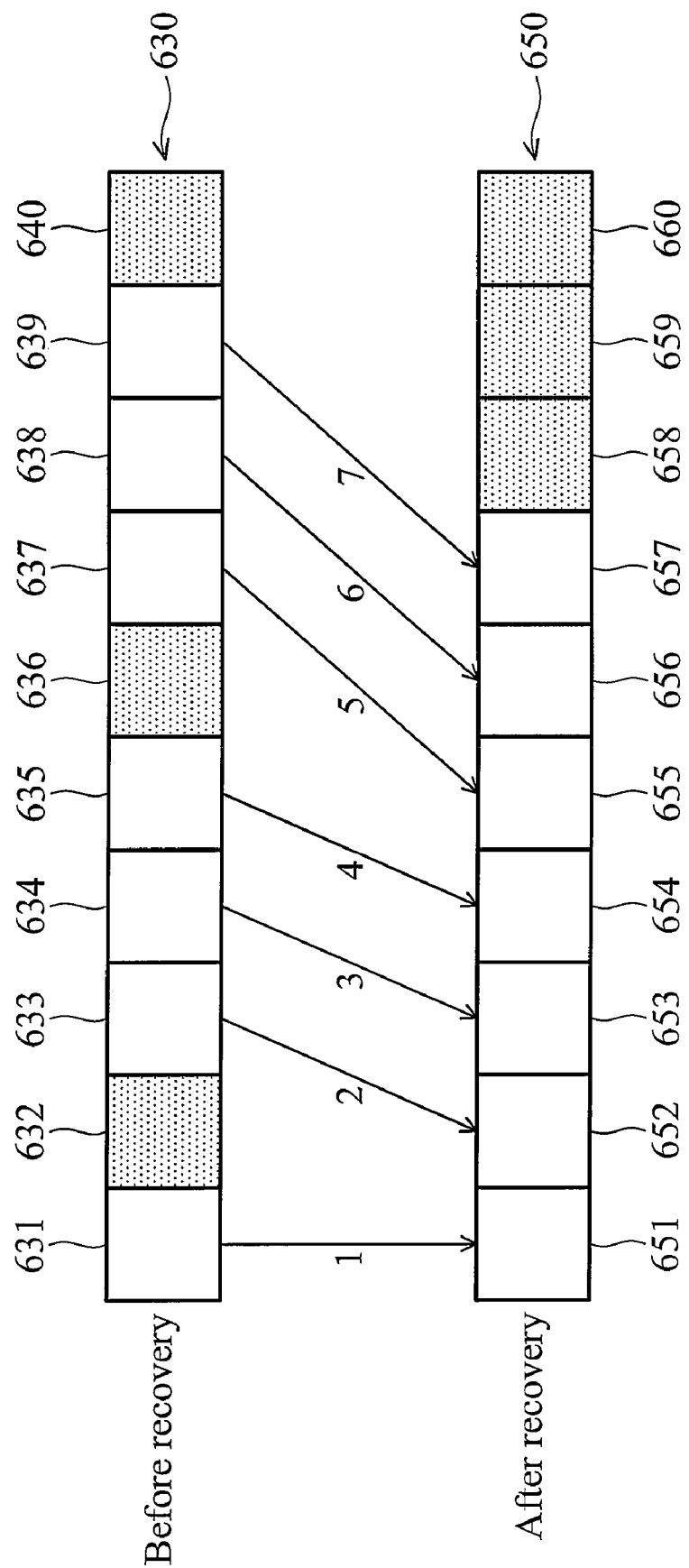
FIG. 6B shows a replacement area before replacement area recovery and a replacement area after replacement area recovery

To recover the released replacement units, the location of the released replacement units must be first known. The mapping relation between the replacement unit and the corresponding defective recording unit is stored as a secondary defect list (SDL) in the defect table of an optical disc. The format of SDL 600 is shown in FIG. 6A. For example, the bits 32~55 of SDL 600 records the first physical unit number of the defective recording unit, and the bits 0~23 of SDL 600 records the first physical unit number of the corresponding replacement unit. When a replacement unit is released, the bit 31 of SDL 600 is set as "1" to indicate the replacement unit is a released replacement unit, and the corresponding defective recording unit, bits 32~55, is set as "0xFFFFFF". Thus, the locations of the released replacement units are easily found by searching the defect table for the bits 0~23 of the SDLs of the released replacement units. FIG. 6B shows a replacement area 630 before replacement area recovery operation and a replacement area 650 after replacement area recovery operation. The replacement units 631, 633~635, and 637~639 are occupied and have mapping relationship with corresponding defect recording units, and the replacement units 632, 636, and 640 are marked as a released replacement unit. After replacement area recovery, the original data of occupied replacement units are rearranged to replacement units 651~657, and three spare replacement units 658~660 are left for storing new data of new defective recording units.

Figure 7A:
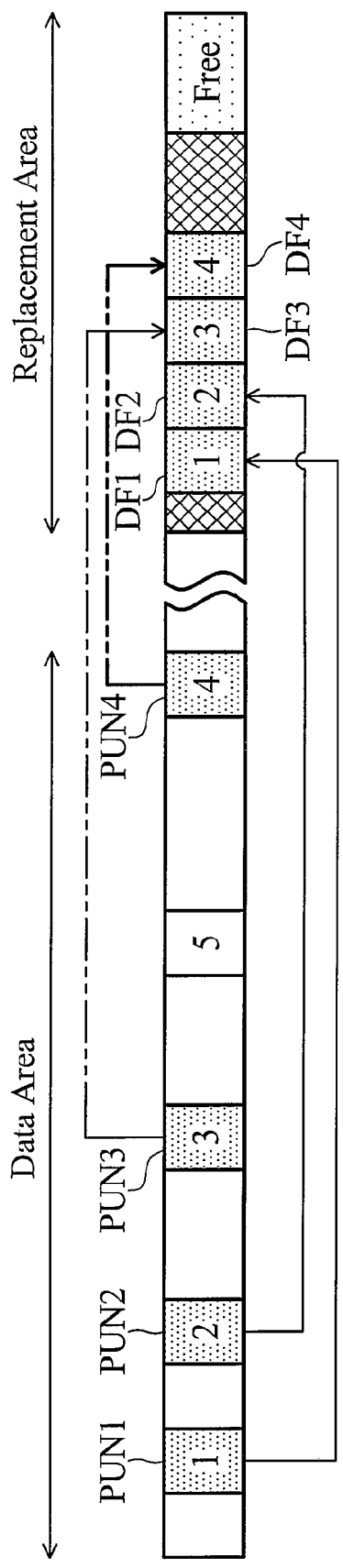
FIG. 7A shows the distribution of replacement units before defragment operation.
Figure 7B:
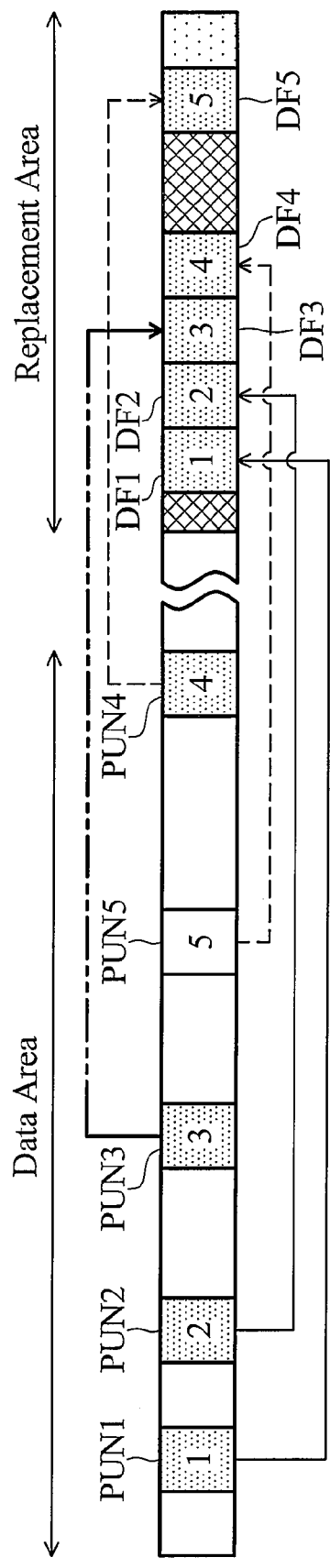
FIG. 7B shows the distribution of replacement units after the defragment operation is performed according to the writing method.

When data is written to an optical disc, new defect recording units may be detected and in some case it may cause the replacement units becoming fragment. FIG. 7a shows the distribution of replacement units before defragment operation. Four replacement units DF1, DF2, DF3, and DF4 in the replacement area are respectively replacing the defective recording units PUN1, PUN2, PUN3, and PUN4. As for the writing method for performing the defragment operation, the original replacement units corresponding to the original defective recording units and new replacement units corresponding to new generated defective recording units are rearranged when data is written to the optical disc to reduce the fragmented status value. FIG. 7B shows the distribution of replacement units after the defragment operation is performed according to the writing method. The original replacement units DF1~DF4 and the new replacement unit DF5 corresponding to new generated defective recording unit PUN5 are rearranged to reduce the fragmented status value.

Figure 8:
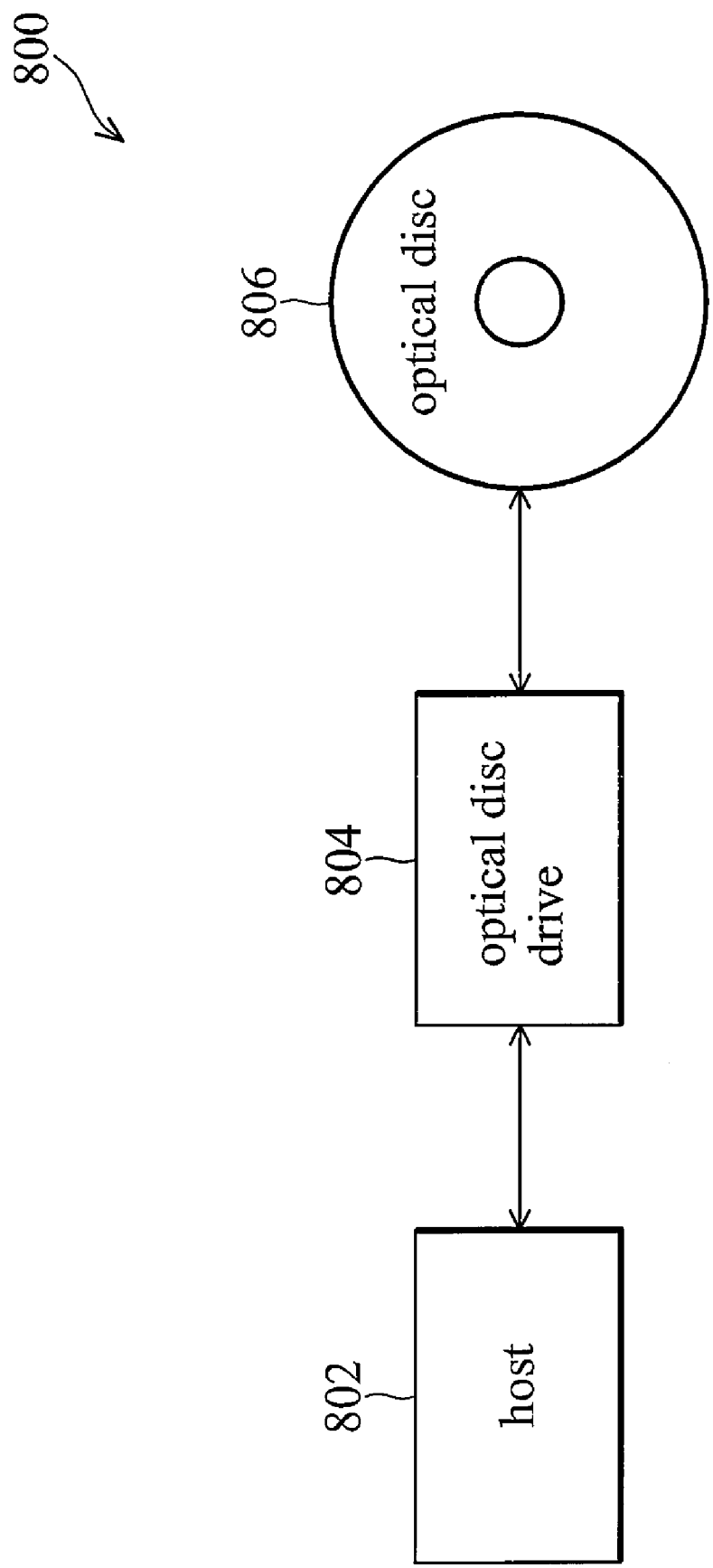
FIG. 8 shows a block diagram of an embodiment of a defect management system according to the invention.
Figure 9A:
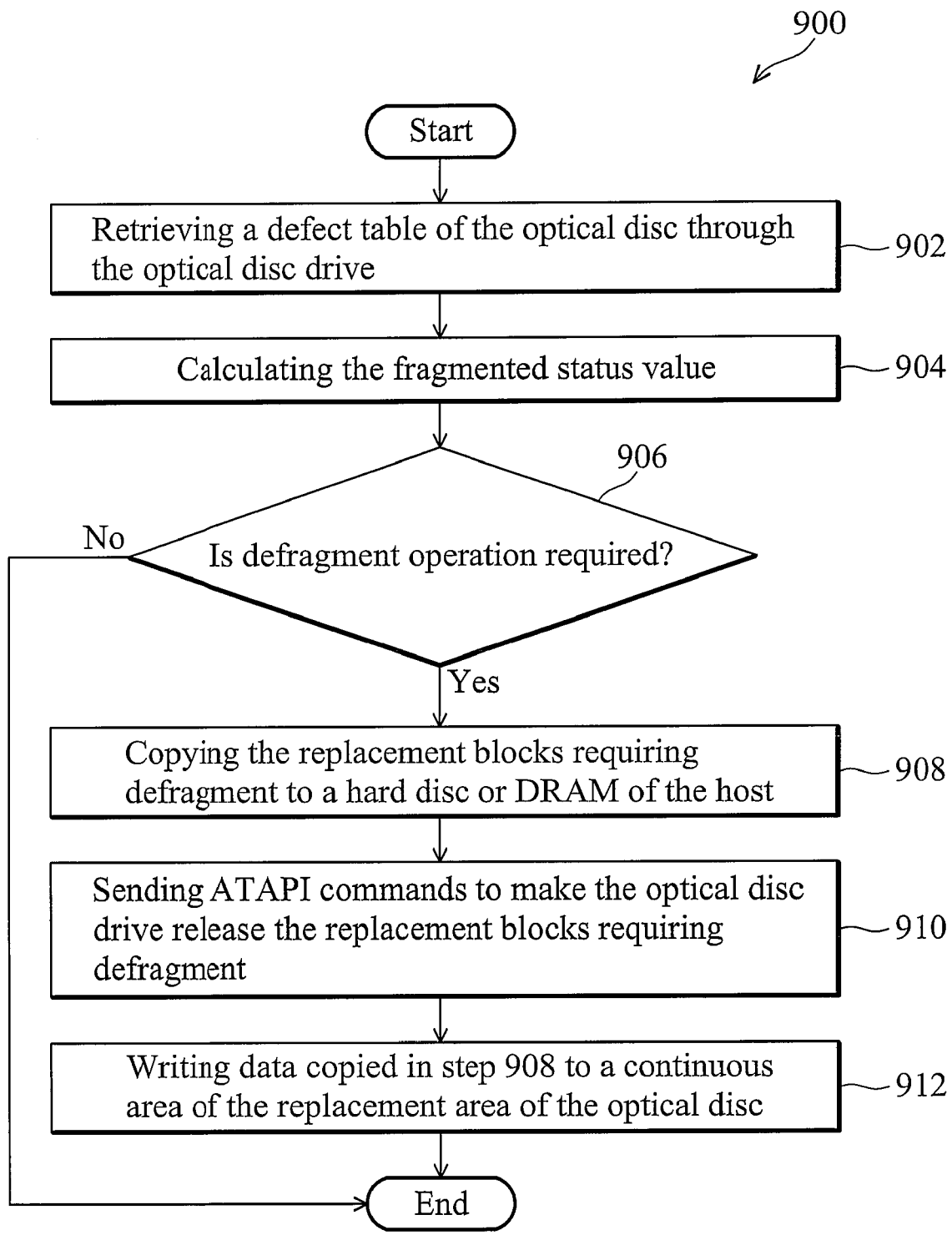
FIG. 9A is a flowchart of a method for defect management initiated by the host 802 according to the invention.
Figure 9B:
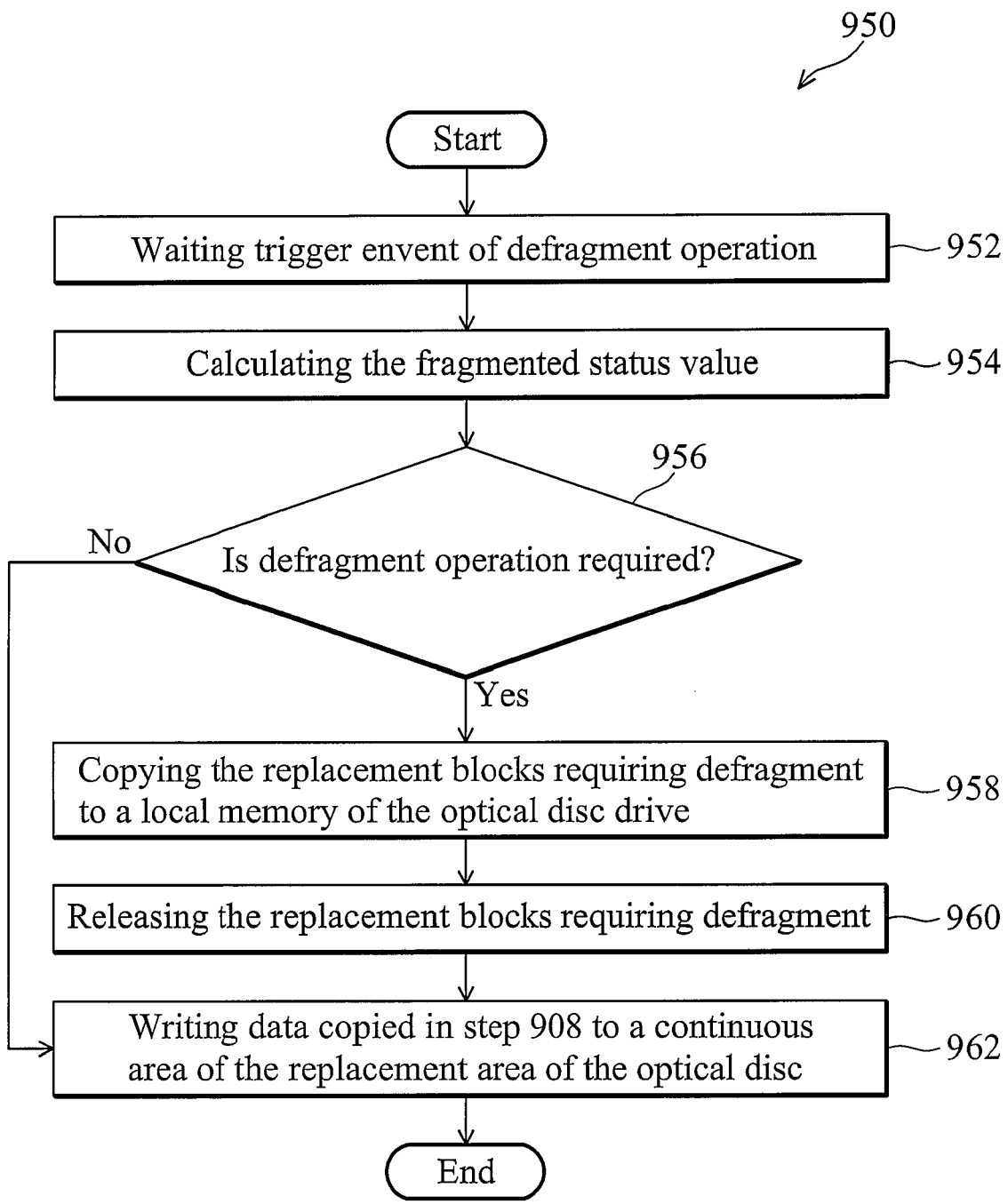
FIG. 9B is a flowchart of a method for defect management implemented by the optical disc drive according to the invention.

FIG. 8 shows a block diagram of an embodiment of a defect management system 800 according to the invention. The defect management system 400 includes a host 802, an optical disc drive 804, and an optical disc 806. The host 802 can access the optical disc 806 via the optical disc drive 804. The optical disc 806 is rewritable, and has a data area including recording units and a replacement area including replacement units, which contain data copies corresponding to related defective recording units. The whole defect management can be completed under the effort of merely the optical disc drive 802 or the cooperation of both the host 802 and the optical disc drive 804. FIG. 9A is a flowchart of a method 900 for defect management initiated by the host 802 according to the invention. First, the host 802 retrieved the defect table of the optical disc 806 through the optical disc drive 804 in step 902. The host 802 then calculates a fragmented status value as listed with algorithm (2), (3), or (4) in step 904, and determines whether to execute defragment operation according to the fragmented status value in step 906. If defragment operation is determined to be executed in step 906, the replacement units requiring defragment are copied to a hard disc or DRAM of the host 802 in step 908. If the fast method shown in FIG. 4B is used to implement defragment operation, the host 802 then sends ATAPI commands to make the optical disc drive 804 release the replacement units requiring defragment in step 910, and the data copied in step 908 is then written to a continuous area of the replacement area of the optical disc 806 in step 912. FIG. 9B is a flowchart of a method 950 for defect management implemented by the optical disc drive 804 according to the invention. The major difference between methods 900 and 950 is that all steps of method 950 are executed by the optical disc drive 804. In addition, the replacement units requiring defragment are copied to a local memory of the optical disc drive 804 in step 958.

When the optical disc drive 804 is idle, the defragment operation can be automatically activated by the optical disc drive 804. This is called "background defragment operation".

Figure 10A:
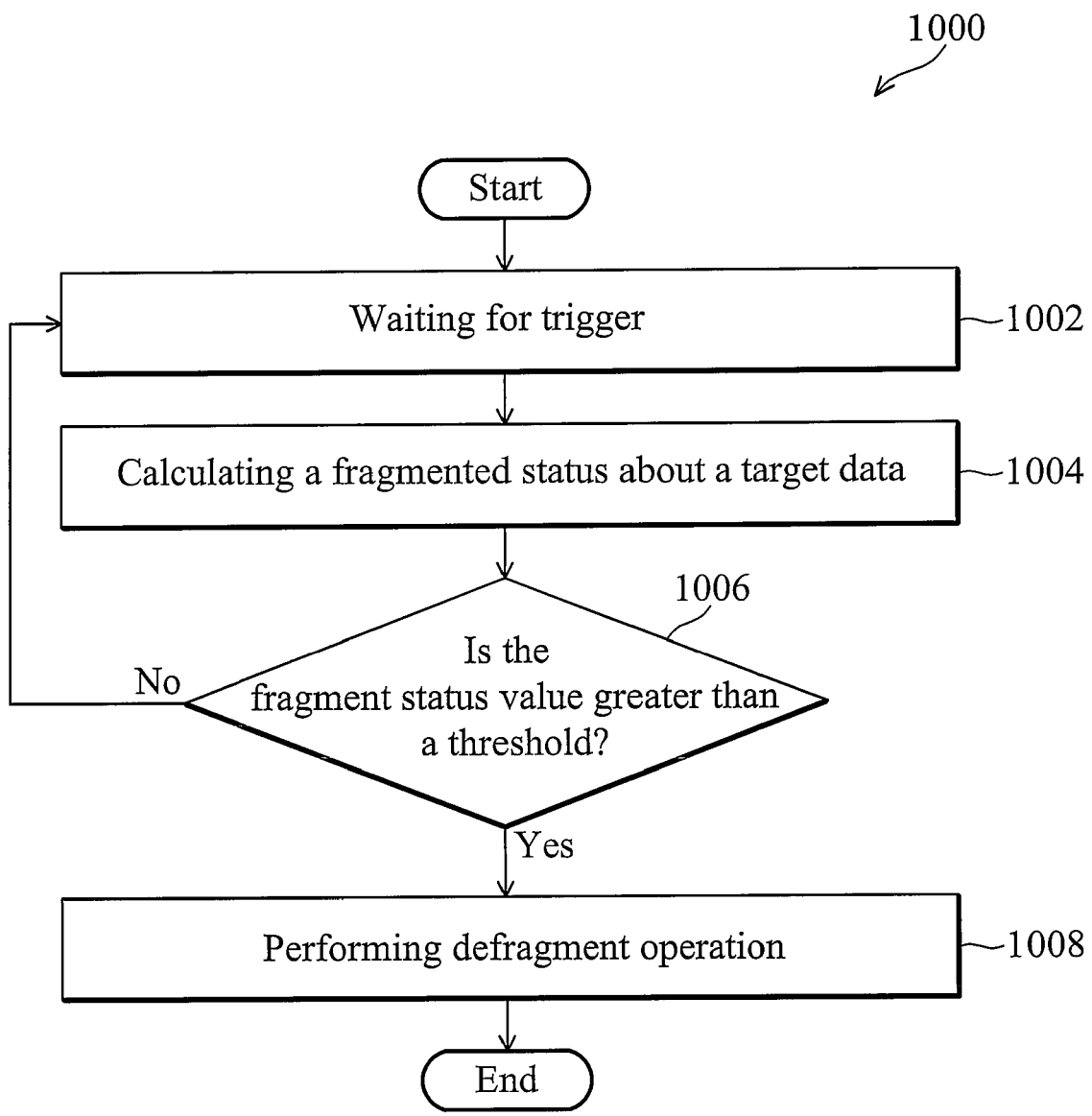
FIG. 10A is a flowchart of a method for recording data requiring defragment.
Figure 10B:
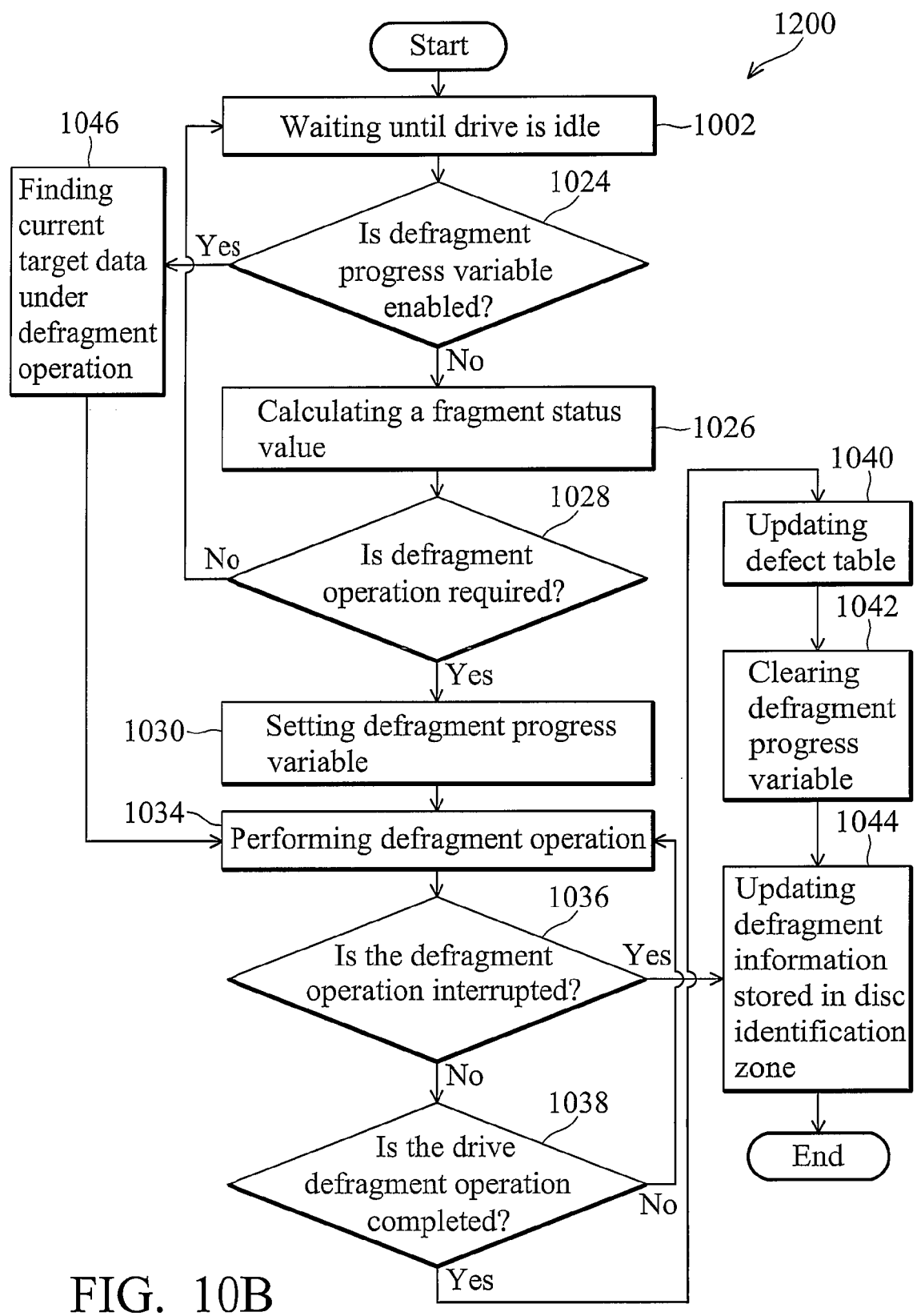
FIG. 10B. is a flowchart of a method for implementing the background defragment operation.

FIG. 10A and FIG. 10B are flowcharts of background defragment operation. FIG. 10A is a flowchart of a method 1000 for recording data requiring defragment. The optical disc drive 804 periodically detects data requiring defragment. When the detection is triggered in step 1002, the trigger may be stationary trigger or dynamic trigger. A fragmented status value about the replacement area is then calculated according the calculation algorithms (1), (2), (3), or (4) in step 1004. Whether to defragment the replacement area of the rewritable optical storage medium is then determined in step 1006 according to the fragmented status value calculation of step 1004. If the fragmented status value is greater than the threshold value in step 306, defragment operation is performed in step 308, so that the replacement area are rearranged in accordance with the sequence of the defective recording units.

When the optical disc drive 804 is idle, the background defragment operation is automatically triggered if the fragmented status value is greater than the threshold value. FIG. 10B is a flowchart of a method 1020 for implementing the background defragment operation. When the optical disc drive 804 is idle in step 1022, a defragment progress variable indicating whether the optical disc drive 804 is under defragment operation is checked. The defragment progress variable can be recorded in the disc identification zone of the optical disc drive 804. If the defragment progress variable indicates that the optical disc drive 804 is not under defragment operation, a fragmented status value about the target data is then calculated according the calculation algorithms (1), (2), (3), or (4) in step 1026. Whether to defragment the target data is then determined in step 1028 according to the fragmented status value calculation of step 1026. The defragment progress variable is then set in step 1030 to indicate a progress status of defragment operation. And the defragment operation is executed according to the fast, slow, or writing methods in step 1034.

When the defragment operation is interrupted, such as interrupted by the host 802, by an interrupt command in step 1036, the optical disc drive 804 suspends the defragment operation in progress. The defragment information, including a pointer pointing to the target data currently under defragment operation, is updated in step 1044. If there is no interrupt in step 1036, the defragment operation is executed till all target data requiring defragment operation finished. After the defragment operation is finished in step 1038, the original replacement units are released and the defect table of the optical disc drive 804 is updated in step 1040. The defragment progress variable is then cleared in step 1042, and defragment information stored in the disc identification zone is finally updated in step 1044.

The invention provides a method for defect management of a rewritable optical disc. A fragmented status about data is calculated as a reference to determine whether the data requires defragment, wherein the fragmented status indicates the distribution of the replacement units corresponding to the defective recording units. Three algorithms are provided to calculate the fragment status value. If the fragmented status value is larger than a threshold, a defragment operation is executed on the replacement units of the target data. Three methods are provided to implement the defragment operation, which can be completed under the efforts of merely the optical disc drive or the cooperation of both the drive and the host. Finally, a method for implementing background defragment operation is provided.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for defect management of a rewritable optical disc, wherein the rewritable optical disc has a data area comprising recording units for storing a target data and a replacement area comprising first replacement units for replacing defective recording units of the data area, the method comprising:
    calculating a fragmented status of the target data, wherein the fragmented status reflects a dispersion level of the first replacement units in view of a distribution of the defective recording units;
    comparing the fragmented status with a first threshold value to determine whether to perform a defragment operation about the target data; and
    performing the defragment operation about the target data by rearranging the first replacement units in accordance with the sequence of the defective recording units.

2. The method as claimed in claim 1, wherein the fragmented status is obtained by dividing a replacement unit distribution of the first replacement units by a defective recording units distribution of the defective recording units.

3. The method as claimed in claim 2, wherein the first replacement unit distribution represents an absolute value of a difference between a largest and a smallest physical unit numbers of the first replacement units, and the defective recording unit distribution represents an absolute value of a difference between a largest and a smallest physical unit numbers of the defective recording units.

4. The method as claimed in claim 2, wherein the replacement unit distribution represents a variance of a physical unit numbers of the first replacement units, and the defective recording unit distribution represents a variance of a physical unit numbers of the defective recording units.

5. The method as claimed in claim 1, wherein the fragmented status value is determined by total seek times and obtained according to the following algorithm:

$$\text{Fragmented\_Status\_Value} = \sum_{K=0}^{N-1} R(k);$$

wherein if (replace_PUN(k)−replace_PUN(k−1))>replace_cache_size then R(k)=1 else R(k)=0;
wherein k is an index of the first replacement units, N is the total number of the first replacement units, and replace_PUN is a physical unit number of the first replacement unit.

6. The method as claimed in claim 1, wherein the defragment operation includes rearranging all the first replacement units of the replacement area of the rewritable optical disc to form a second replacement units, so that the second replacement units are successively arranged adjacent to each other.

7. The method as claimed in claim 1, wherein the defragment operation is performed when the target data is written to the rewritable optical disc, and the first replacement units corresponding to the defective recording units and a second replacement unit corresponding to a new detected defective recording units are rearranged to form a second replacement units during data writing operation.

8. The method as claimed in claim 1, wherein the defragment operation includes the following steps:
   allocating second replacement units from the replacement area;
   copying data of the first replacement units to the second replacement units, so that the second replacement units are successively arranged adjacent to each other; and
   releasing the first replacement units.

9. The method as claimed in claim 8, wherein the method further comprises recovering the released first replacement units by rearranging the replacement area.

10. The method as claimed in claim 9, wherein the step of recovering the released first replacement units comprise the following steps:
   detecting whether all of the replace units of both a primary spare area and a secondary spare area of the replacement area are not available;
   checking whether a number of released first replacement units of the replacement area is greater than a second threshold; and
   rearranging the replacement area.

11. The method as claimed in claim 10, wherein the step of rearranging the replacement area comprises following steps:
   checking secondary defect lists of a defect table of the optical disc to find locations of released first replacement units of the replacement area; and
   rearranging all non-released first replacement units to leave the released first replacement units as spare ones.

12. A system for performing defragment of a rewritable optical disc, wherein the rewritable optical disc has a data area comprising recording units for storing a target data and a replacement area comprising first replacement units for replacing defective recording units, the system comprising:
   a host, calculating a fragmented status reflecting a dispersion level of the first replacement units in view of a distribution of the defective recording units, and comparing the fragmented status with a first threshold value to determine whether to perform a defragment operation about the target data; and
   an optical disc drive, coupled to the host, performing the defragment operation about the target data by rearranging the first replacement units in accordance with the sequence of the defective recording units.

13. The system as claimed in claim 12, wherein the fragmented status is obtained by dividing a replacement unit distribution of the first replacement units by a defective recording unit distribution of the defective recording units.

14. The system as claimed in claim 12, wherein the optical disc drive performs the defragment operation by rearranging all the first replacement units of the replacement area of the rewritable optical disc to form a second replacement units, so that the second replacement units are successively arranged adjacent to each other.

15. The system as claimed in claim 12, wherein the optical disc drive first allocates second replacement units from the replacement area, then copies data of the first replacement units to the second replacement units so that the second replacement units are successively arranged adjacent to each other, and then releases the first replacement units, thus performing the defragment operation.

16. The system as claimed in claim 12, wherein the optical disc drive rearranges the first replacement units corresponding to the defective recording units and a new replacement unit corresponding to a new detected defective recording unit when the target data is written to the rewritable optical disc, thus performing the defragment operation.

17. An optical disc drive for performing defragment of a rewritable optical disc, wherein the rewritable optical disc comprises a data area comprising recording units for store a target data and a replacement area comprising first replacement units for replacing defective recording units, the optical disc drive calculates a fragmented status reflecting a dispersion level of the first replacement units in view of a distribution of the defective recording units, compares the fragmented status with a first threshold value to determine whether to perform a defragment operation about the target data, and performs the defragment operation about the target data by rearranging the first replacement units in accordance with the sequence of the defective recording units.

18. The optical disc drive as claimed in claim 17, wherein the fragmented status is obtained by dividing a replacement unit distribution of the first replacement units by a defective recording unit distribution of the defective recording units.

19. The optical disc drive as claimed in claim 17, wherein the optical disc drive performs the defragment operation by rearranging all the first replacement units of the replacement area of the rewritable optical disc to form second replacement units, so that the second replacement units are successively arranged adjacent to each other.

20. The optical disc drive as claimed in claim 17, wherein the optical disc drive first allocates second replacement units from the replacement area, then copies data of the first replacement units to the second replacement units so that the second replacement units are successively arranged adjacent to each other, and then releases the first replacement units, thus performing the defragment operation.

* * * * *